United States Patent Office 2,780,162
Patented Feb. 5, 1957

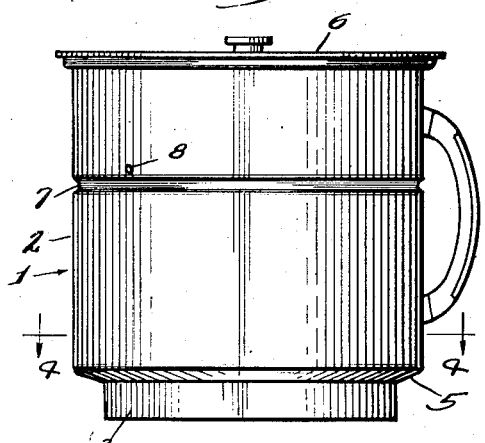
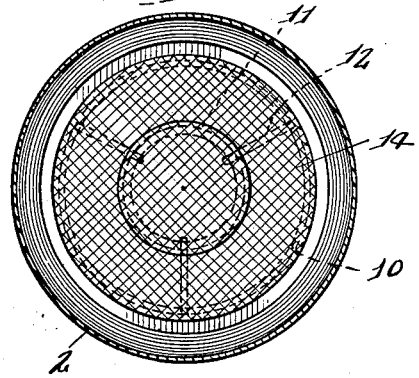
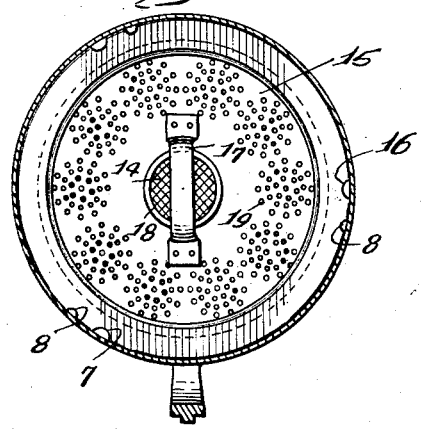
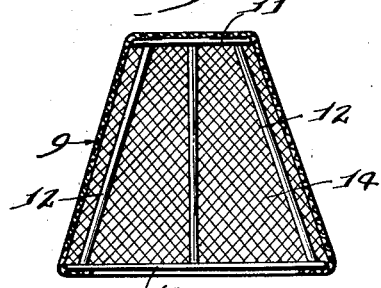
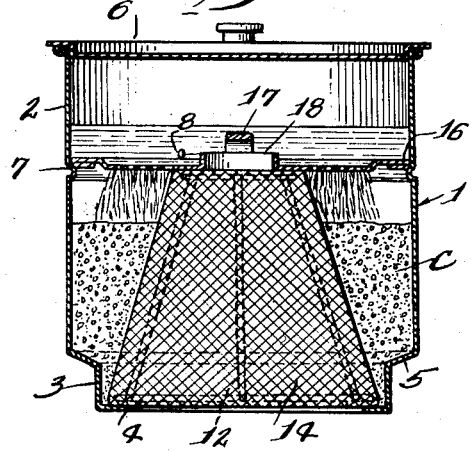
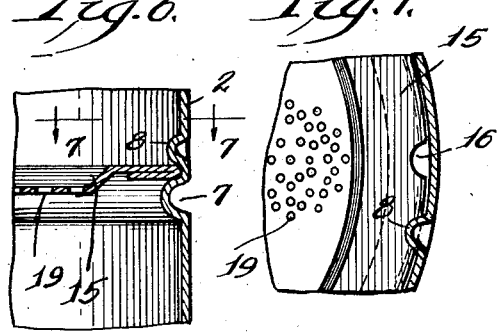
Inventor:
Rubin Chaplik,
By W"F. Freudenreich,
Attorney.

2,780,162
COFFEE EXTRACTORS
Rubin Chaplik, Chicago, Ill.
Application January 19, 1956, Serial No. 560,085
2 Claims. (Cl. 99—306)

The present invention relates to the art of coffee making and particularly to means for brewing or extracting coffee in automatic coffee makers.

In my prior Patent No. 2,706,444 there is disclosed an automatic coffee maker provided with twin coffee urns; an extractor being set on each urn to deliver to it coffee as it is brewed and filtered. In this prior apparatus the extractor comprises an open-ended cylindrical shell, a detachable filter unit forming a transverse partition in the lower end of the shell, and a detachable, perforated water distributing plate set into the shell well above the filter. In use of the apparatus ground coffee is poured onto the filter and then, after the distributor plate has been inserted, a measured quantity of hot water is delivered into the shell on top of such plate. The hot water drips down into the coffee grounds and eventually reaches and passes through the filter.

The capacity of the aforesaid extractor is limited. If, for example, such an extractor is entirely satisfactory for the purpose of making three gallons of coffee at one operation, the mere addition of enough ground coffee and water does not result in automatic brewing of six or ten gallons of equally good coffee.

The object of the present invention is to create an improved extractor which shall brew good coffee efficiently and rapidly, regardless of the number of gallons of coffee, within the capacity of the urn which receives it, to be made at any one time.

In carrying out my invention I provide means to permit some water to flow directly into the urn when entering the extractor faster than it can be take up by the ground coffee.

The various features of novelty characterizing the present invention will hereinafter be pointed out in the claims; but, for a full understanding of the invention and its objects and advantages, reference may be had to the following detailed description taken in connection with the accompanying drawing, wherein:

Fig. 1 is a side elevational view of an extractor embodying the present invention;

Fig. 2 is a top plan view of said extractor with the cover removed;

Fig. 3 is a vertical, axial section through the extractor, with the cover applied after the proper quantity of water has been pumped in, and with the filter shown in elevation;

Fig. 4 is view showing the shell as being a section on line 4—4 of Fig. 1 and the filter as viewed from above;

Fig. 5 is a vertical, axial section of the filter;

Fig. 6 is a vertical, axial section, on a larger scale, showing fragments of the shell and the distributor plate; and Fig. 7 is a section on line 7—7 of Fig. 6.

Referring to the drawing, 1 is an open-ended sheet metal shell having a cylindrical body portion 2 and, at the bottom, a short cylindrical section 3 of lesser diameter. At the lower end of section 3 is a continuous, internal, imperforate flange 4. Part 3 may enter the top of an urn (not shown), with shoulder 5 resting on the upper edge of the urn. The shell is provided with the usual cover 6. The cylindrical wall of the body portion is deformed to create an internal rib 7 extending around the interior of the shell nearer the upper end than the lower end. The cylindrical wall is further deformed to create one or more little projections 8 located only a short distance above rib 7.

A filter unit 9 is adapted to be set into the shell, on and supported by flange 4. This unit comprises a light frame over which is placed a sheathing of filtering cloth. The frame is shown as being composed of two wire rings, 10 and 11, and a series of straight wires or rods 12. Ring 10 is almost as large in diameter as section 3 of the shell, while ring 11 is much smaller. These rings are connected together by straight wires 12 to create a frusto-conical structure that reaches up to the plane of rib 7 when resting on flange 4. This frame structure is encased in a piece of filtering cloth 14 fashioned into the shape of a frusto-conical cup a little deeper than the height of the wire frame. The cloth is patterned and sewn in such a manner that, when the frame is pressed into the cup-like formation, the cloth snaps inwardly over the wire of the large ring and secures itself snugly over the frame. Then, when this cup shaped device is set upside down on flange 4, the filtering cloth constitutes a gasket between the filter unit and the flange that supports it.

Cooperating with the shell and the filter unit is a distributor plate 15 which rests at its margin on rib 7 and, at the center, on the small end of the filter unit. In the edge of this plane are notches 16 which, when registering with projections 8, permit the plate to be placed in position in the shell or to be removed at will. After the plate has been placed in position so as to rest on rib 7, it need only be turned through a small angle to be locked against rising by projections 8. Plate 15 is provided with a handle 17 by means of which it may be turned, or held while being raised or lowered.

At the center of the distributor plate is a hole outlined by a lower annular ledge 18. This hole may be of any desired size except that it should not be larger than the adjacent end of the filter unit.

In the space between ledge 18 and the edge of the plate are perforations 19 through which water may seep. For making a brew, the filter unit is set into the shell and ground coffee is deposited in the space surrounding such unit. The distributor plate is then inserted and locked. With the shell resting on an urn and hot water being available, all that need be done is to deliver the required amount of hot water into the shell at any point clear of the hole in the distributor plate. The water passes down through the perforations directly into the ground coffee and cannot escape except through the filtering cloth.

No water reaches the urn without contacting the ground coffee so long as the water can flow through the perforations in the distributor plate as rapidly as it is being received in the shell. However, should water remain on top of this plate and rise above the top of the ledge surrounding the central hole in the plate, then further excess of water may flow directly through this hole and into the urn, its progress delayed only by the layer of filtering material spanning such hole. In other words, so long as there is any water on top of the distributor plate at least some can pass down into the mass of ground coffee; but if the water escapes too slowly in that manner enough can bypass the ground coffee to prevent overflow at the top of the shell which would leave the urn with too little water. Therefore, any desired large amount of water may be pumped rapidly into the shell without waste of time, without fear of depreciating the quality of the coffee in the urn and without danger of overflow.

I claim:

1. A coffee extractor consisting of a shell having at the bottom a large central opening separated from the surrounding wall by a narrow flange projecting inwardly from such wall, a filter in the form of an inverted cup of frusto-conical shape with its small end at the top and of considerable diameter, a bead projecting inwardly from the shell near the top of the filter, a distributor plate resting on said bead and positioned close to the filter top, said plate having in the center a hole no larger in area than the top of the filter, a low ledge surrounding said hole, there being perforations in the area of the plate surrounding the ledge and surrounded by the shell, and a cover for the top of the shell.

2. A coffee extractor as set forth in claim 1, wherein the filter comprises a wire frame and a flexible sheet of filter cloth fitted over the frame to form the bottom wall and the side wall of the cup.

References Cited in the file of this patent

UNITED STATES PATENTS

| | | |
|---|---|---|
| 90,159 | Erskine | May 18, 1861 |
| 746,063 | Fyfe | Dec. 8, 1903 |
| 767,778 | Vansant | Aug. 16, 1904 |
| 866,985 | Trewhella | Sept. 24, 1907 |
| 1,462,610 | Meyer | July 24, 1923 |
| 1,601,987 | Topper | Oct. 5, 1926 |
| 2,047,135 | Coleman | July 7, 1936 |